(12) United States Patent
Kackmann-Schneider et al.

(10) Patent No.: US 10,682,806 B2
(45) Date of Patent: Jun. 16, 2020

(54) PROCESS FOR PRODUCING A SURFACE COVERING WITH AN EMBOSSED PRINTED SURFACE

(71) Applicant: Tarkett GDL, Lentzweiler (LU)

(72) Inventors: Klaas Kackmann-Schneider, Wiltz (LU); Igor Brankov, Wiltz (LU); Jean-Yves Simon, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 407 days.

(21) Appl. No.: 15/512,991

(22) PCT Filed: Sep. 28, 2015

(86) PCT No.: PCT/EP2015/072272
§ 371 (c)(1),
(2) Date: Mar. 21, 2017

(87) PCT Pub. No.: WO2016/050696
PCT Pub. Date: Apr. 7, 2016

(65) Prior Publication Data
US 2017/0297257 A1    Oct. 19, 2017

(30) Foreign Application Priority Data
Sep. 29, 2014   (EP) .................................. 14186831

(51) Int. Cl.
*B29C 55/00* (2006.01)
*B29C 59/00* (2006.01)
(Continued)

(52) U.S. Cl.
CPC .......... *B29C 59/026* (2013.01); *B29C 55/026* (2013.01); *B29C 59/046* (2013.01);
(Continued)

(58) Field of Classification Search
CPC ....... B29C 55/00; B29C 55/02; B29C 55/026; B29C 59/00; B29C 59/02; B29C 59/026;
(Continued)

(56) References Cited

U.S. PATENT DOCUMENTS 6,272,982 B1 * 8/2001 Stauffacher ............. B29C 59/04
101/181
2013/0295352 A1 * 11/2013 Thiers ................... B32B 38/145
428/211.1

FOREIGN PATENT DOCUMENTS

EP    2636524 A1    9/2013

OTHER PUBLICATIONS

International Search Report; International Application No. PCT/EP2015/072272; International Filing Date Sep. 28, 2015; dated Dec. 23, 2015, 3 Pages.
(Continued)

*Primary Examiner* — Jacob T Minskey
*Assistant Examiner* — Matthew Hoover
(74) *Attorney, Agent, or Firm* — Cantor Colburn LLP

(57) ABSTRACT

A process for producing a surface covering with an embossed printed surface is described. A substrate (16) is continuously moved through a production line, and this substrate (16) is first provided, in a printing equipment (12), with a printed pattern and thereafter, in an embossing equipment (14), with an embossed pattern, which is registered with the printed pattern. The printing equipment (12) produces the printed pattern in-line with the production of the embossed pattern. During printing in the printing equipment (12), the printed pattern is stretched or compressed, dynamically responsive to indicators of misalignments between the printed pattern and the embossed pattern, so as to correct or prevent the misalignments. A production line for carrying out this process is also proposed.

14 Claims, 2 Drawing Sheets

(51) Int. Cl.
| | |
|---|---|
| B32B 3/00 | (2006.01) |
| B32B 27/00 | (2006.01) |
| B32B 37/00 | (2006.01) |
| B32B 41/00 | (2006.01) |
| B32B 43/00 | (2006.01) |
| B41F 19/00 | (2006.01) |
| B44C 1/00 | (2006.01) |
| B44F 9/00 | (2006.01) |
| E04F 13/00 | (2006.01) |
| E04F 15/00 | (2006.01) |
| B29C 59/02 | (2006.01) |
| E04F 15/10 | (2006.01) |
| B32B 27/08 | (2006.01) |
| B32B 27/30 | (2006.01) |
| B29C 59/04 | (2006.01) |
| B41F 19/02 | (2006.01) |
| B44C 1/24 | (2006.01) |
| B32B 27/34 | (2006.01) |
| B32B 27/32 | (2006.01) |
| B32B 27/12 | (2006.01) |
| B29C 55/02 | (2006.01) |
| B29C 65/00 | (2006.01) |
| B32B 3/30 | (2006.01) |
| B32B 37/20 | (2006.01) |
| B44F 9/02 | (2006.01) |
| B44F 9/04 | (2006.01) |
| E04F 13/08 | (2006.01) |
| B32B 38/00 | (2006.01) |
| B32B 38/06 | (2006.01) |
| B29K 105/00 | (2006.01) |
| B29L 31/00 | (2006.01) |

(52) U.S. Cl.
CPC ........ B29C 66/87 (2013.01); B29C 66/93451 (2013.01); B32B 3/30 (2013.01); B32B 27/08 (2013.01); B32B 27/12 (2013.01); B32B 27/30 (2013.01); B32B 27/304 (2013.01); B32B 27/32 (2013.01); B32B 27/34 (2013.01); B32B 37/206 (2013.01); B32B 41/00 (2013.01); B32B 43/00 (2013.01); B41F 19/02 (2013.01); B44C 1/24 (2013.01); B44F 9/02 (2013.01); B44F 9/04 (2013.01); E04F 13/0871 (2013.01); E04F 15/107 (2013.01); *B29K 2105/256* (2013.01); *B29L 2031/732* (2013.01); *B32B 27/00* (2013.01); *B32B 38/06* (2013.01); *B32B 38/145* (2013.01); *B32B 2041/04* (2013.01); *B32B 2255/02* (2013.01); *B32B 2255/10* (2013.01); *B32B 2255/26* (2013.01); *B32B 2260/021* (2013.01); *B32B 2260/046* (2013.01); *B32B 2262/101* (2013.01); *B32B 2307/412* (2013.01); *B32B 2307/75* (2013.01); *B32B 2309/14* (2013.01); *B32B 2419/04* (2013.01); *B32B 2607/00* (2013.01)

(58) Field of Classification Search
CPC ....... B29C 59/04; B29C 59/046; B29C 66/00; B29C 66/80; B29C 66/87; B29C 66/90; B29C 66/93; B29C 66/934; B29C 66/9345; B29C 66/93451; B32B 3/00; B32B 3/30; B32B 27/00; B32B 27/08; B32B 27/10; B32B 27/12; B32B 27/30; B32B 27/304; B32B 27/32; B32B 27/34; B32B 37/00; B32B 37/20; B32B 37/206; B32B 41/00; B32B 43/00; B41F 19/00; B41F 19/02; B44C 1/00; B44C 1/20; B44C 1/24; B44F 9/00; B44F 9/02; B44F 9/04; E04F 13/00; E04F 13/08; E04F 13/087; E04F 13/0871; E04F 15/00; E04F 15/10; E04F 15/107
See application file for complete search history.

(56) References Cited

OTHER PUBLICATIONS

Written Opinion of the International Searching Authority; International Application No. PCT/EP2015/072272; International Filing Date Sep. 28, 2015; dated Dec. 23, 2015, 6 pages \* cited by examiner

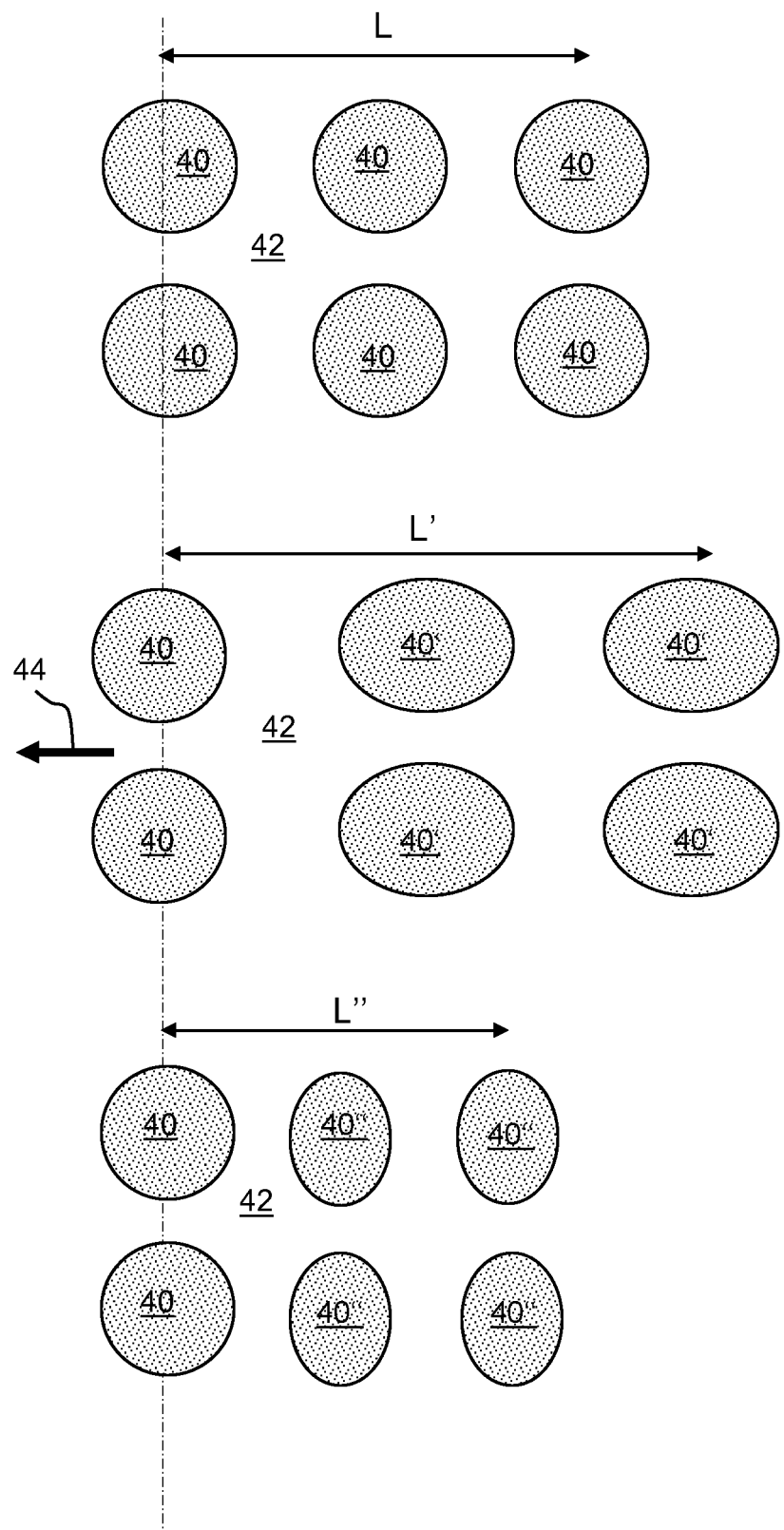

PROCESS FOR PRODUCING A SURFACE COVERING WITH AN EMBOSSED PRINTED SURFACE

CROSS REFERENCE TO RELATED APPLICATIONS

This is a U.S. national stage of PCT international application No. PCT/EP2015/072272, filed on 28 Sep. 2015. Priority under 35 U.S.C. § 119(a) and 35 U.S.C. § 365(b) is claimed from European Application No. 14186831.5 filed on 29 Sep. 2014, the disclosure of which is also incorporated herein by reference in its entirety.

TECHNICAL FIELD

The present invention generally relates to a process for producing a surface covering with an embossed printed surface. It relates more particularly to such a process, wherein a substrate is moved through a production line, and the moving substrate is first provided with a printed pattern and thereafter with an embossed pattern, which is to be registered with the printed pattern.

BACKGROUND ART

A known problem to be solved in conjunction with such a process is to prevent, correct or reduce misalignments between the printed pattern and the embossed pattern.

To solve this problem, EP 2636524 A1 suggests to preheat the substrate carrying the printed pattern and to stretch it thereafter in a controlled manner, so as to adjust the pitch of the printed pattern to the pitch of the embossed pattern. However, it is well known in the art that a longitudinal stretching causes a transversal necking of the flexible substrate, thereby transversely deforming the printed pattern. To avoid such an undesired transversal necking of the substrate, EP 2636524 A1 suggests that the stretching of the substrate carrying the printed pattern shall take place in several pairs of heated, small diameter cylinders, which are located upstream of a bigger diameter embossing cylinder. It will consequently be appreciated that the stretching as proposed in EP 2636524 A1, necessitates considerable stretching equipment in the production line. Furthermore, to carry out the proposed process, the substrate carrying the printed pattern must be easily stretchable without any major drawbacks, which is surely not the case for every otherwise desirable substrate. To be less limited in the choice of the substrate, EP 2636524 A1 further suggests to print the printed pattern onto an auxiliary film, and to stretch this film it in a controlled manner, so as to continuously adjust the pitch of the printed pattern on the auxiliary film to the pitch of the embossed pattern, before laminating the stretched film onto the moving substrate. However, this way to proceed makes the proposed process even more complicated.

Hence, there is a need for a simpler process for preventing or reducing misalignments between the printed pattern and the embossed pattern.

SUMMARY OF INVENTION

The invention concerns a process for producing a surface covering with an embossed printed surface, wherein a substrate is continuously moved through a production line, and this substrate is first provided with a printed pattern and thereafter with an embossed pattern, which is to be registered with the printed pattern. In accordance with the invention, a printing equipment is used in the production line to produce the printed pattern in-line with the embossed pattern. During printing in the printing equipment, the printed pattern is stretched or compressed, dynamically responsive to indicators of misalignments between the printed pattern and the embossed pattern, so as to correct or prevent these misalignments. It will be appreciated that this process allows to correct or prevent misalignments between the printed pattern and the embossed pattern, without having to stretch a substrate or film bearing the printed pattern, thereby avoiding the aforementioned transversal necking and other drawbacks, and without necessitating considerable auxiliary equipment in the production line. Any stretching or compression of the printed pattern is relative to the substrate on which is printed, and the stretching or compression of the printed pattern does not result, by itself, in a corresponding stretching or compression of the substrate itself.

The surface covering produced in accordance with the present invention is preferably a resilient floor or wall covering of the heterogeneous (multilayer) type. Such a heterogeneous resilient surface covering may e.g. be commercialised in the form of rolls, sheets, tiles and/or planks.

The printing equipment is preferably a digital printing equipment, most preferably an inkjet printer, wherein the printed pattern is stretched or compressed by simply controlling the digital printing equipment. In particular, the printed pattern may be easily stretched or compressed by modifying digital printing data. For example, the printed pattern can be stretched by digitally up-scaling and compressed by digitally down-scaling a digitally recorded image of the pattern to be printed. This scaling may concern the whole digitally recorded image or only part thereof, e.g. one or more details or one or more sections of the digitally recorded image. The details and or sections to be stretched or compressed can be chosen so that the stretching or compressing are not easily noticed. The scaling will most often be unidirectional, wherein the scaling direction corresponds to the longitudinal direction of the printed pattern on the moving substrate. Such a unidirectional scaling allows to preserve the original width of the printed pattern, while it is stretched or compressed in the longitudinal direction. One notable advantage of the invention is that longitudinal and transversal corrections can be carried out independently. This is not the case in embossing-in-register processes, in which the substrate carrying the printed pattern is stretched, because stretching in longitudinal direction typically results in a deformation of the substrate in transversal direction, making it difficult to simultaneously achieve alignment in both directions.

Alternatively, the printed pattern can be stretched or compressed by increasing or reducing the velocity with which the substrate passes through the printing equipment. In this embodiment, an accumulation loop, which is arranged between the printing equipment and an embossing equipment, allows to control the velocity of the substrate in the printing equipment independently from its velocity in the embossing equipment, while maintaining the tension in the moving substrate substantially constant.

It may be worthwhile explicitly noting that the substrate is not cut into pieces (e.g. tiles or planks or precursors thereof) between the printing equipment and the embossing equipment of the production line. In other words, the moving substrate remains continuous at least up to the point where it passes the embossing equipment.

A rotating embossing cylinder is usually used for providing the embossed pattern. In this case, an angular encoder may be used for continuously measuring the angular position of the rotating embossing cylinder. This angular position signal is then used as a real-time process parameter for continuously determining the position of the embossing pattern relative to the moving substrate.

The proposed process advantageously comprises the step of comparing a dimension of the printed pattern (for example the distance between two longitudinally spaced reference marks printed with the printed pattern), which is measured on the moving substrate, with a reference value this dimension should have to properly match with a corresponding dimension in the embossed pattern, wherein the printed pattern is stretched or compressed during printing, so as to reduce a difference between the measured dimension and the reference value. This process allows to correct or prevent deformations of the printed pattern, which would result in misalignments with the embossed pattern.

The proposed process may also comprise the steps of comparing, on the moving substrate, the positions of the printed pattern and the embossed pattern relative to one another, and temporarily stretching or compressing, during printing, the printed pattern to reduce an offset between these positions. This process allows for example to correct or prevent, during production, registration mistakes or deviations between the printed pattern and the embossed pattern.

The process may further comprise the step of predicting, on the basis of measurements made on the moving substrate upstream of the embossing equipment and measurements made on the embossing equipment itself and/or downstream of the embossing equipment, an offset between the embossed pattern and the printed pattern, wherein the printed pattern is stretched or compressed during printing, so as to reduce the predicted offset.

According to an additional aspect, the process comprises the step of measuring, at at least one position between the printing equipment and the embossing equipment, the passage times of reference marks printed on the substrate; or the step of measuring at regular time intervals, at at least one position between the printing equipment and the embossing equipment, the longitudinal offsets between the detected positions of reference marks printed on the substrate and the computed positions of the reference marks for the specific time. The measured passage times or the measured offsets are then used to predict a misalignment between the printed pattern and the embossed pattern at the embossing equipment, wherein the predicted misalignment is used to compute a required stretching or compression of the printed pattern during printing. It will be appreciated that this process allows to rapidly react to a danger of growing misalignments between the printed pattern and the embossed pattern.

In the aforementioned case, the passage times or offsets of the reference marks are advantageously measured at several positions along the path of movement of the substrate between the printing equipment and the embossing equipment. The measured passage times or the measured offsets may then be used to predict an evolution of the alignment/misalignment of the printed pattern with the embossed pattern at the embossing equipment, wherein this predicted evolution is used to compute a preventive stretching or compression of the printed pattern during printing.

The proposed process may further comprise the steps of applying between the printing equipment and the embossing equipment a transparent wear layer onto the printed pattern, and embossing the embossed pattern into the transparent wear layer in the embossing equipment.

The invention further concerns a production line for producing a surface covering with an embossed printed surface. The production line comprises: a printing equipment for applying a printed pattern onto a moving substrate; an embossing equipment downstream of the printing equipment, for providing the substrate with an embossed pattern registered with the printed pattern, and control equipment for correcting or preventing misalignments between the printed pattern and the embossed pattern, by stretching or compressing the printed pattern during printing, dynamically responsive to real-time indicators of such misalignments, in particular by controlling the printing equipment, which is a digital printing equipment, or by reducing or increasing the velocity with which the substrate passes through the printing equipment.

BRIEF DESCRIPTION OF DRAWINGS

The afore-described and other features, aspects and advantages of the invention will be better understood on the basis of the following description of an embodiment of the invention and upon reference to the attached drawings, wherein:

FIG. 3A, 3B, 3C: are schematics illustrating a stretching and compressing of the printed pattern during pritting.

DETAILED DESCRIPTION OF AN EMBODIMENT OF THE INVENTION

It will be understood that the following description and the drawings to which it refers describe and illustrate, by way of example, preferred embodiments of the claimed subject matter. They shall not limit the scope, nature or spirit of the claimed subject matter.

Figure 1:
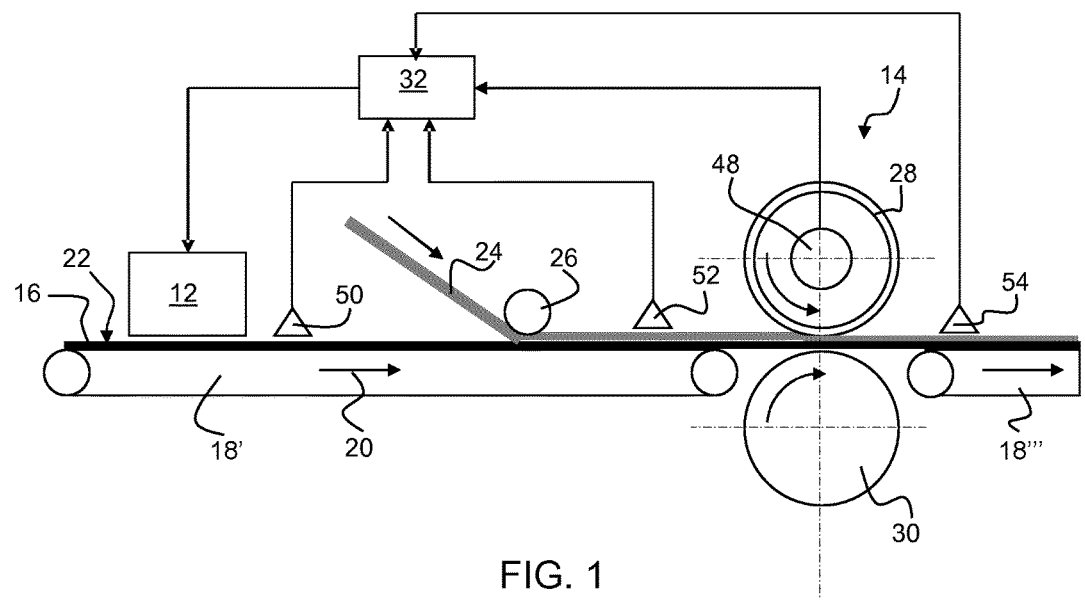
FIG. 1: is a schematic illustrating a first embodiment of a section of a production line used for implementing the present invention.
Figure 2:
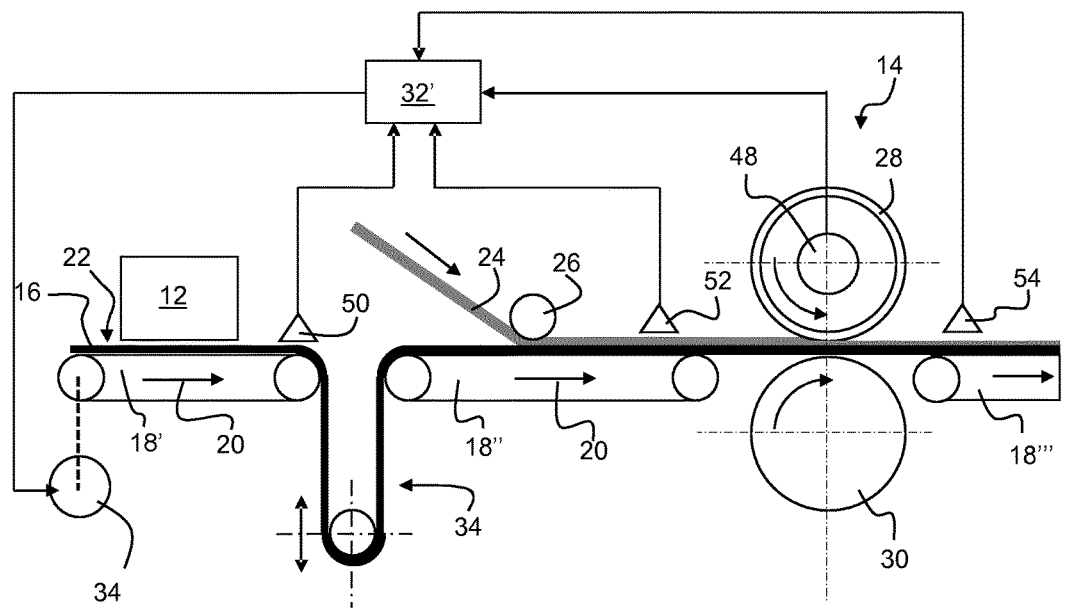
FIG. 2: is a schematic illustrating a second embodiment of a section of a production line used for implementing the present invention.

FIGS. 1 and 2 schematically illustrate a section 10 of a production line used for producing a flexible surface covering with a printed and embossed decorative surface. This surface covering is for example a polymer-based flexible flooring, such as for example a heterogeneous or homogeneous vinyl flooring. The embossed printed surface simulates, for example, the natural appearance of hardwood, stone or tile flooring, by adding depth and texture in alignment with a printed pattern. However, the printed pattern may also comprise any other decorative design or pictures, wherein the embossed pattern is registered with this decorative design or these pictures to confer a 3D aspect to the design or the pictures.

It will be understood that FIGS. 1 and 2 only show equipment that is directly relevant for the present invention. Thus, the section 10 shown in FIGS. 1 and 2 starts with a printing equipment 12 and ends with an embossing equipment 14. The complete production line may be more than 100 m long. The distance between the printing equipment 12 and the embossing equipment 14 shall normally be less than 5 m, preferably less than 2 m and, if possible, even less than 1 m, but may exceptionally also be greater than 5 m.

Reference number 16 points to a substrate that is continuously produced in other sections of the production line, which are arranged upstream of the printing equipment 12. This substrate 16 travels on carrier belts 18', 18", 18''' through the section 10 of the production line, in the direction of arrows 20, i.e. from the printing equipment 12 to the embossing equipment 14. The terms "upstream" and "downstream" are used herein with reference to the conveying direction of the substrate 16, which is identified by arrows 20. The term "longitudinal" is generally used herein to refer to a direction that is parallel to the conveying direction. The term "width" is generally used herein to refer to a dimension that is transversal to the conveying direction.

The substrate 16 can be a homogeneous substrate or a multilayer substrate. It is for example a homogeneous or multilayer plastic foil, made for example of the following materials: PVC, vinyl, polyethylene, polypropylene or polyamide. Its thickness is generally in the range of 2 mm to 5 mm. The width of the substrate 16 is typically in the range of 2 m to 5 m.

At the entrance of the printing equipment 12, the topsurface 22 of the substrate 16 is advantageously formed by a dimensionally relatively stable print support layer. A suitable print support layer is for example a veil of glass fibres or a film that is applied onto the substrate 16 upstream of the printing equipment 12. This print support layer forms the surface onto which the printed pattern is applied in the printing equipment 12. The print support layer can be coated or impregnated with a primer that is selected, amongst others, in function of the base material of the substrate 16, the printing technology and the inks used in the printing equipment 12, and in function of the background colour to achieve. Alternatively, the primer may be directly coated onto the substrate. In exceptional cases, it may even be possible to dispense with the print support layer and the primer, such that printing is effected directly on the substrate.

Instead of printing the printed pattern onto the substrate 16, it is also possible to print, within the production line and synchronously with the production of the substrate 16, the printed pattern onto an auxiliary film, which is applied onto the substrate 16 downstream of the embossing equipment 14. In most cases, it will however be of advantage to print the printed pattern with the printing equipment 12 directly onto the substrate 16, as described in the previous paragraph.

The printing equipment 12 is advantageously an industrial inkjet printer, preferably working with water-based colours, while the use of solvent-based colours is however not excluded. The inkjet printing heads are individually controllable and are distributed over the whole width of the substrate. A drying and/or curing equipment is advantageously arranged in the outlet section of the printing equipment 12, for drying and/or curing the printed pattern. The inkjet printing equipment 12 may include one line of printing heads for each of the four colours generally used in inkjet printing (i.e. cyan, magenta, yellow, and black), wherein two successive lines of printing heads are advantageously separated by a drying equipment for drying (partially or completely) the first colour before the next colour is applied. The drying equipment comprises for example hot air dryer units and/or infrared dryer units. Alternatively, each printing head may be conceived for simultaneously printing more than one colour. In the printing equipment 12, the substrate 16 is advantageously free of substantial mechanical tension, i.e. the substrate simply lies in a substantially tension-free manner on the carrier belt 18'.

Between the printing equipment 12 and the embossing equipment 14, a transparent wear layer 24 is applied onto the upper surface of the moving substrate 16 bearing the printed pattern. This application is for example achieved in a lamination equipment 26 located between the printing equipment 12 and the embossing equipment 14. The transparent wear layer 24 protects the printed pattern on the substrate 16 and forms the layer that is embossed in the embossing equipment 14. A suitable transparent wear layer 24 is e.g. a film of PVC with a thickness in the range of 0.05 to 1 mm. A heater (not shown) is generally arranged between the lamination equipment 26 and the embossing equipment 14, to mollify the wear layer 24 before the substrate 16 enters into the embossing equipment 14.

The embossing equipment 14 comprises for example a rotating embossing cylinder 28 and a backing cylinder 30. The embossing cylinder 28 has a cylindrical surface 31, bearing a negative of the pattern to be embossed into the transparent wear layer 24. The backing cylinder 30 allows to press the substrate 16 with its transparent wear layer 24 against the cylindrical surface 31 of the rotating embossing cylinder 28. Thereby, a positive copy of the negative pattern, which is borne by the embossing cylinder 28, is continuously embossed into the transparent wear layer 24. It will be noted that the pitch of the embossed pattern (i.e. the length of a repeating motif) cannot be greater than the circumference of the embossing cylinder 28. However, the circumference of the embossing cylinder 28 can be a multiple of the pitch of the embossed pattern, i.e. during one revolution, the embossing cylinder 28 the embossing cylinder embosses several repeating motives into the transparent wear layer 24.

In the final surface covering, a 3D feature of the embossed pattern shall occupy a well-defined position relative to a corresponding 2D feature of the underlying printed pattern; i.e. the embossed pattern shall be properly aligned with the underlying printed pattern. However, imperfect initial registration of the 3D pattern with the 2D pattern, imperfect control of the velocities of the carrier belts 18', 18", 18''', of the rotation speed of the lamination rolls or of the embossing and backing cylinder 28, 30, but also changes in the linear expansion/shrinking of the substrate 16, as well as other process disturbances, may result in misalignments between the printed pattern and the embossed pattern (i.e. 3D features of the embossed pattern are no longer aligned with the corresponding 2D features of the underlying printed pattern). It will consequently be appreciated that the present invention proposes to correct or prevent such misalignments, by stretching or compressing the printed pattern, relative to the substrate, during printing, and to this dynamically responsive to real-time indicators of such misalignments.

In accordance with FIG. 1, a controller 32 sends modified printing data to the digital printing equipment 12, thereby instructing the printing equipment 12 to stretch or compress the printed pattern. In practice, this is e.g. achieved by digitally up-scaling respectively by digitally down-scaling a digitally recorded pattern image, wherein the up-scaling will result in a stretching and the down-scaling will result in a compressing of the printed pattern. This scaling may concern the whole digitally recorded pattern image or only part thereof, e.g. one or more details or one or more sections of the digitally recorded image. As misalignments are normally in the direction of movement of the substrate 16, the up-scaling and/or down-scaling are normally a unidirectional scaling, the scaling direction corresponding to the longitudinal direction of the printed pattern on the substrate 16. Such a unidirectional scaling allows to preserve the original width the printed pattern, while it is stretched or compressed in the longitudinal direction.

In accordance with FIG. 2, the printed pattern is stretched or compressed by reducing or increasing the velocity with which the substrate 16 passes through the printing equipment 12. To achieve this aim, a controller 32' modifies for example the speed with which the carrier belt 18' moves the substrate 16 through the printing equipment 12, controlling for example the speed of a drive motor 34 of the carrier belt 18'. An increase of this speed will result in a stretching, whereas its decrease will result in a compressing of the printed pattern. While the velocity with which the substrate 16 passes through the printing equipment 12 is decreased or increased, the velocity with which substrate passes thereafter through the embossing equipment 14 remains basically unchanged. To allow this difference in velocities, an accumulation loop 36 is arranged between the printing equipment 12 and the embossing equipment 14, or more specifically, between the carrier belt 18' carrying the substrate 16 through the printing equipment 12 and the carrier belt 18" transporting it to the embossing equipment 14. The accumulation loop 36 allows to maintain the tension in the moving substrate 16 substantially constant.

FIGS. 3A, 3B and 3C are now used to illustrate the effects of stretching/compressing of the printed pattern. FIG. 3A shows printed pattern consisting of an array of circular surfaces 40, which have a different colour than the background 42. To further fix the ideas, it is assumed that the embossed pattern, which is created by the embossing cylinder 28, comprises an array of raised circular surfaces, which array is an exact image of the array of coloured surfaces 40 shown in FIG. 3A. In the embossed printed surface, the coloured surfaces 40 should be aligned under the raised circular surfaces as precisely as possible.

FIG. 3B shows the printed pattern of FIG. 3A, wherein after the first row of circles 40, the pattern is stretched parallel to the direction of arrow 44. Such a temporary stretching allows to compensate for an offset between the printed pattern and the embossed pattern, in which the printed pattern is, at the embossing equipment, in advance of the embossed pattern. Indeed, in the stretched pattern, the distance L' between the first row of (still undeformed) circles 40 and the third row of circles 40' is greater than the corresponding distance L in the pattern of FIG. 3A. The temporary stretching may be limited to one pattern motif or be distributed over several pattern motifs, so as to make it less apparent. It will further be noted that a stretching of the printed pattern is also an adequate solution if—for any reason—the substrate 16 longitudinally expands less than expected or shrinks more than expected between the printing equipment 12 and the embossing equipment 14.

FIG. 3C shows the printed pattern of FIG. 3A, wherein after the first row of circles 40, the pattern is compressed in the direction of arrow 42. Such a temporary compressing allows for example to compensate for an offset between the printed pattern and the embossed pattern, in which the embossed pattern is in advance of the printed pattern. Indeed, in the compressed pattern, the distance L" between the first row of (still undeformed) circles 40 and the third row of circles 40" is smaller than the corresponding distance L in the pattern of FIG. 3A. The temporary compressing may be limited to one pattern motif or be distributed over several pattern motifs, so as to make it less apparent. A compressing of the printed pattern is also an adequate solution if—for any reason—the substrate 16 longitudinally expands more than expected or shrink less than expected between the printing equipment 12 and the embossing equipment 14.

It remains to be pointed out that the stretching in FIG. 3B and the compressing in FIG. 3C are strongly exaggerated. Most often, the misalignment to compensate is only a few millimetres, and the stretching or compressing of the printed pattern can be limited to similar amounts, i.e. to a range not exceeding several millimetres.

According to a first aspect, the proposed process comprises the steps of: (1) comparing in real-time a detected position of the printed pattern on the moving substrate and a computed position of embossed pattern on the moving substrate; and (2) temporarily stretching or compressing the printed pattern during printing to reduce an offset between these positions.

According to a second aspect, the proposed process comprises the steps of: (1) predicting, responsive to real-time indicators, an offset between the embossed pattern and the printed pattern; and (2) stretching or compressing the printed pattern to prevent or reduce the predicted offset.

According to a third aspect, the proposed process comprises the steps of: (1) comparing a dimension of the printed pattern, which is measured in real-time on the moving substrate, with a reference value this dimension should have to properly match with a corresponding dimension in the embossed pattern; and (2) stretching or compressing the printed pattern to reduce any difference between the measured dimension and the reference value.

Referring again to FIGS. 1 and 2, the control circuit used for controlling the stretching/compressing of the printed pattern will now be further described. It will first be noted that the embossing cylinder 28 is equipped with an angular encoder 50 continuously measuring the angular position of the rotating embossing cylinder 28. This angular position signal is then used as a real-time process parameter for continuously determining the position of the embossing pattern relative to the moving substrate 16 in the embossing equipment 14. Reference numbers 50, 52 point to sensors (typically optical sensors) capable of detecting reference marks printed onto the substrate 16, synchronously with the printed pattern. In a first embodiment, the sensors 50, 52 are used to measure the passage times of these reference marks at predetermined positions between the printing equipment and the embossing equipment. In a second embodiment, the sensors 50, 52 are used to measure, at regular time intervals, the longitudinal offsets between the detected position of a reference mark and the computed position this reference mark is supposed to have at that time. The measured passage times or the measured offsets are then used to predict a misalignment between the printed pattern and the embossed pattern at the embossing equipment, wherein this predicted misalignment is used to compute a required stretching or compression of the printed pattern. If the passage times or offsets of the reference marks are measured at several positions along the path of movement of the substrate 16 between the printing equipment 12 and the embossing equipment 14, the measured passage times or the measured offsets can be used to predict an evolution of the alignment of the printed pattern with the embossed pattern at the embossing equipment 14. The predicted evolution of the alignment may then be used to compute a preventive stretching or compression of the printed pattern. Reference number 54 points to an additional sensor arranged downstream of the embossing equipment 14, which is mainly used to detect an offset that has its origin only closely before or within embossing equipment 14.

LIST OF REFERENCE NUMBERS

10 section of production line
12 printing equipment
14 embossing equipment
16 substrate
18', 18", 18''' carrier belt
20 direction arrows 22 top surface of 16
24 transparent wear layer
26 lamination equipment
28 embossing cylinder
30 backing cylinder
31 cylindrical surface
32, 32' controller
34 drive motor of 18'
36 accumulation loop
40 circular surface
40' surfaces 40 when the printed pattern is stretched
40" surfaces 40 when the printed pattern is compressed
42 arrow
48 angular encoder
50, 52, 54 optical sensor

The invention claimed is:

1. A process for producing a surface covering with an embossed printed surface, wherein a substrate is continuously moved through a production line, and said substrate is first provided with a printed pattern and thereafter with an embossed pattern, which is to be registered with said printed pattern;
wherein a printing equipment is used in said production line to produce said printed pattern in-line with the production of said embossed pattern by an embossing equipment, the substrate remaining continuous at least up to where the substrate passes the embossing equipment;
wherein between the printing equipment and the embossing equipment a transparent wear layer is applied onto the printed pattern;
wherein the embossed pattern is embossed into the transparent wear layer in the embossing equipment; and
wherein misalignments between said printed pattern and said embossed pattern are corrected or prevented by stretching or compressing said printed pattern relative to the substrate on which is printed, during printing in said printing equipment, dynamically responsive to indicators of said misalignments between said printed pattern and said embossed pattern.

2. The process as claimed in claim 1, wherein said printing equipment a digital printing equipment, and said printed pattern is stretched or compressed by controlling said digital printing equipment.

3. The process as claimed in claim 2, wherein said printed pattern is stretched, respectively compressed, by up-scaling, respectively down-scaling, in real-time at least a part of a digitally recorded image of said pattern to be printed.

4. The process as claimed in claim 3, wherein said up-scaling and/or down-scaling is a unidirectional scaling, the scaling direction corresponding to a longitudinal direction of said printed pattern on said moving substrate.

5. The process as claimed in claim 1, wherein said printed pattern is stretched or compressed by reducing or increasing a velocity with which said substrate passes through said printing equipment.

6. The process as claimed in claim 4, wherein an accumulation loop, which is arranged between said printing equipment and the embossing equipment, allows to control a velocity of said substrate in said printing equipment independently from the velocity of said substrate in said embossing equipment, while maintaining tension in said moving substrate substantially constant.

7. The process as claimed in claim 1, wherein:
a rotating embossing cylinder is used for providing said embossed pattern in the surface covering, the embossing cylinder having an angular position that changes as the embossing cylinder rotates; and
an angular encoder is used for continuously measuring the angular position of said embossing cylinder; and
said angular position signal is used as a real-time process parameter for continuously determining the position of said embossing pattern relative to said substrate while said substrate is moving.

8. The process as claimed in claim 1, further comprising the steps of:
comparing a dimension of said printed pattern, which is measured in real-time on said substrate as said substrate is moving, with a reference value said dimension should have to match with a corresponding dimension in said embossed pattern; and
during printing, stretching or compressing said printed pattern to reduce the difference between said measured dimension and said reference value.

9. The process as claimed in claim 1, further comprising the steps of:
comparing in real-time a detected position of said printed pattern on said substrate and a computed position of the embossed pattern on said substrate; and
temporarily stretching or compressing said printed pattern during printing, to reduce an offset between the detected position of said printed pattern and the computed position of the embossed pattern.

10. The process as claimed in claim 1, further comprising the steps of:
predicting, on the basis of measurements made on said substrate upstream of said embossing equipment, an offset between said embossed pattern and said printed pattern; and
during printing, stretching or compressing said printed pattern to reduce said offset.

11. The process as claimed in claim 1, wherein the embossing equipment is downstream of said printing equipment, the process further comprising the steps of:
measuring, at at least one position between said printing equipment and the embossing equipment, passage times of reference marks printed on said substrate; or
measuring at regular time intervals, at at least one position between said printing equipment and the embossing equipment, longitudinal offsets between detected positions of reference marks printed on said substrate and the computed positions of said reference marks at said regular time intervals; and
using the passage times that were measured or the offsets that were measured to predict a misalignment between said printed pattern and said embossed pattern at said embossing equipment; and
using the misalignment that is predicted to compute a required stretching or compression of said printed pattern.

12. The process as claimed in claim 11, wherein:
the passage times of the reference marks or the longitudinal offsets are measured at several positions along a path of movement of said substrate between said printing equipment and said embossing equipment; and
the passage times or the longitudinal offsets are used to predict an evolution of the alignment of said printed pattern with said embossed pattern at said embossing equipment; and
said predicted evolution of said alignment is used to compute a preventive stretching or compression of said printed pattern.

13. The process as claimed in claim 1, wherein said printing equipment is an inkjet printer.

14. The process as claimed in claim 1, wherein the surface covering is a heterogeneous resilient floor or wall covering.

* * * * *